US009548951B2

(12) United States Patent
Tomkins et al.

(10) Patent No.: US 9,548,951 B2
(45) Date of Patent: Jan. 17, 2017

(54) PROVIDING ADDITIONAL INFORMATION RELATED TO A VAGUE TERM IN A MESSAGE

(71) Applicant: Google Inc., Mountain View, CA (US)

(72) Inventors: Andrew Tomkins, Menlo Park, CA (US); Shanmugasundaram Ravikumar, Berkeley, CA (US); Shalini Agarwal, San Francisco, CA (US); MyLinh Yang, Saratoga, CA (US); Bo Pang, Sunnyvale, CA (US); Mark Yinan Li, San Francisco, CA (US)

(73) Assignee: Google Inc., Mountain View, CA (US)

( * ) Notice: Subject to any disclaimer, the term of this patent is extended or adjusted under 35 U.S.C. 154(b) by 255 days.

(21) Appl. No.: 14/145,017

(22) Filed: Dec. 31, 2013

(65) Prior Publication Data

US 2015/0188854 A1 Jul. 2, 2015

(51) Int. Cl.
*G06F 17/30* (2006.01)
*H04L 12/58* (2006.01)
*G06F 17/27* (2006.01)
*G06Q 30/02* (2012.01)
*H04W 4/14* (2009.01)

(52) U.S. Cl.
CPC ........... *H04L 51/063* (2013.01); *G06F 17/273* (2013.01); *G06F 17/3053* (2013.01); *G06F 17/30749* (2013.01); *G06F 17/30867* (2013.01); *H04L 51/32* (2013.01); *G06Q 30/02* (2013.01); *H04L 12/58* (2013.01); *H04L 51/04* (2013.01); *H04W 4/14* (2013.01)

(58) Field of Classification Search
USPC .................... 709/206; 707/999.003; 455/466
See application file for complete search history.

(56) References Cited

U.S. PATENT DOCUMENTS

| 6,115,709 A | 9/2000 | Gilmour et al. |
| 6,438,543 B1 | 8/2002 | Kazi et al. |
| 7,475,010 B2 | 1/2009 | Chao |

(Continued)

OTHER PUBLICATIONS

International Search Report and Written Opinion of PCT Ser. No. PCT/US14/72712 Jun. 25, 2015.

(Continued)

*Primary Examiner* — Kyung H Shin
(74) *Attorney, Agent, or Firm* — Middleton Reutlinger

(57) ABSTRACT

Methods and apparatus related to providing additional information related to a vague term in a message. For example, in some implementations, one or more messages sent by a sender and received by one or more recipients may be identified, a vague term in the message may be identified, a user-restricted database may be identified that is associated with the sender or a recipient, and additional information related to the vague term may be determined from the user-restricted database. A vague term is a term which may have multiple meanings and that can be clarified with additional information. In some implementations, user-restricted databases may include additional information that is associated with the user that may be utilized to replace the vague term with a clarified term. In some implementations, a user-restricted database may be utilized to identify additional information in another database that may be utilized to clarify the vague term.

22 Claims, 7 Drawing Sheets

(56) References Cited

U.S. PATENT DOCUMENTS

| | | | |
|---|---|---|---|
| 7,496,500 | B2 | 2/2009 | Reed et al. |
| 7,640,233 | B2 | 12/2009 | Baartman et al. |
| 7,672,833 | B2 | 3/2010 | Blume et al. |
| 7,702,631 | B1 | 4/2010 | Basu et al. |
| 7,813,916 | B2 | 10/2010 | Bean |
| 8,046,226 | B2 | 10/2011 | Soble et al. |
| 8,055,707 | B2 | 11/2011 | Desai et al. |
| 8,364,467 | B1 | 1/2013 | Bowman et al. |
| 8,375,099 | B2 | 2/2013 | Carroll et al. |
| 8,457,950 | B1 | 6/2013 | Gardner et al. |
| 8,521,818 | B2 | 8/2013 | McGann et al. |
| 8,527,522 | B2 | 9/2013 | Baron et al. |
| 8,538,466 | B2 | 9/2013 | Gupta et al. |
| 8,868,590 | B1 * | 10/2014 | Donneau-Golencer  G06F 17/3053 707/733 |
| 2008/0059421 | A1 * | 3/2008 | Baartman ............. G06F 17/273 |
| 2010/0035639 | A1 * | 2/2010 | Gupta .................... H04W 4/14 455/466 |
| 2011/0137636 | A1 | 6/2011 | Srihari et al. |
| 2012/0005221 | A1 | 1/2012 | Ickman et al. |
| 2012/0030588 | A1 | 2/2012 | Sinha |
| 2012/0150532 | A1 | 6/2012 | Mirowski et al. |
| 2012/0239761 | A1 | 9/2012 | Linner et al. |
| 2012/0317499 | A1 | 12/2012 | Shen |
| 2013/0073662 | A1 | 3/2013 | Meunier et al. |
| 2013/0290436 | A1 | 10/2013 | Martin et al. |

OTHER PUBLICATIONS

Corston-Oliver, Simon et al, "Task-Focused Summarization of Email," Microsoft Research Jul. 2004, (http://www1.cs.columbia.edu/~lokesh/pdfs/Corston.pdf), 8 pages.

Laclavik, et al., "Email Analysis and Information Extraction for Enterprise Benefit," Institute of Informatics, Slovak Academy of Sciences, Slovakia, Computing and Informatics, vol. 30, 2011, pp. 57-87.

Komen, Erwin R. "Coreference Annotation Guidelines1," 2009, 13 pages.

\* cited by examiner

- Dinner on Thursday

To: joe@exampleurl.com (Joe),
      bobw@exampleurl.com (Bob Williams)
  From: jim@exampleurl.com (Jim)

Joe and Bob,

We are having a dinner at <u>my house</u>. Can you make it?

Jim

---

To: jim@exampleurl.com (Jim)
  From: joe@exampleurl.com (Joe)
  CC: bob@exampleurl.com (Bob)

Jim,

Can we go to my girlfriend's house (456 Main Street) instead?

Joe

Message: Dinner on Thursday
Term: "my house"

Would you like to clarify this?

☑ 123 Main Street
☐ Other

OK    CANCEL

FIG. 6

PROVIDING ADDITIONAL INFORMATION RELATED TO A VAGUE TERM IN A MESSAGE

BACKGROUND

A user may utilize one or more systems to create messages and send the messages to one or more contacts of the user. The user may send messages to multiple contacts and one or more of the contacts may reply to one or more of the contacts and the user.

SUMMARY

This specification is generally directed to methods and apparatus related to determining additional information to clarify a vague term in a message that is associated with two or more users. Users include a sender of the message and include one or more recipients of the message. The additional information to clarify a vague term may be determined based on a user-restricted database of one of the users associated with the message. A user-restricted database is a database that is associated with a user, wherein the associated user may control access to the user-restricted database for one or more other users. Some implementations are directed to identifying a message, determining one or more vague terms in the message, identifying a user-restricted database associated with one or more users associated with the message, determining additional information from the user-restricted database to clarify the message, and providing the additional information to one or more of the users. Some implementations are directed to utilizing a content database to determine an entity that may be utilized to determine additional information from the user-restricted database. In some implementations, a user-restricted database associated with a given user may be accessed only with permission from the given user.

In some implementations, a method is provided that includes the steps of: identifying a message that is associated with two or more users, the users including a sender and one or more recipients, and the message including one or more terms; determining one or more vague terms of the terms; identifying a user-restricted database, the user-restricted database associated with a given user of the users and including content personal to the given user and wherein access to the user-restricted database is limitable by the given user; determining, based on the user-restricted database, additional information that is related to the vague term; and providing the additional information to at least one of the users.

This method and other implementations, of technology disclosed herein may each optionally include one or more of the following features.

The method may further include the step of identifying an entity that is associated with the vague term, wherein the step of determining additional information may include determining, from the user-restricted database, a second entity that is related to the entity.

The method may further include the step of identifying an entity that is associated with the vague term, wherein the step of determining, based on the user-restricted database, additional information may include determining a property of the entity from the user-restricted database.

The user-restricted database may include content related to a previous message between the sender and at least one of the recipients.

The vague terms may include a reference to the given user, and the user-restricted database may be associated with the given user.

The message may be part of a message trail of messages.

The step of providing the additional information may include providing a notification to the sender. The notification may include a prompt for the sender to grant permission to allow the providing of the additional information.

The step of providing the additional information may include providing a notification to at least one of the recipients. The notification may include a reference to the one or more vague terms. The notification may be the message with the one or more vague terms replaced with the additional information.

The step of determining the additional information may require permission from the user that is associated with the user-restricted database.

The one or more vague terms may include a pronoun, and the step of identifying the user-restricted database of one of the users may include determining the one of the users that is referenced by the pronoun.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein determine clarifying information for a vague term that is identified in a message. The clarifying information may be determined based on information that is identified in one or more user-restricted databases that are associated with the sender or a recipient of the message. The clarifying information may be provided to the sender or a recipient as a clarification for the vague term in the message. In some implementations, user-restricted databases that are associated with the sender or the recipient may be accessed only with permission from the associated user.

It should be appreciated that all combinations of the foregoing concepts and additional concepts discussed in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 is an example of a message that has been clarified with additional information.

FIG. 6 is a suggestion notification to prompt a sender of a message that includes a vague term.

DETAILED DESCRIPTION

Figure 1:
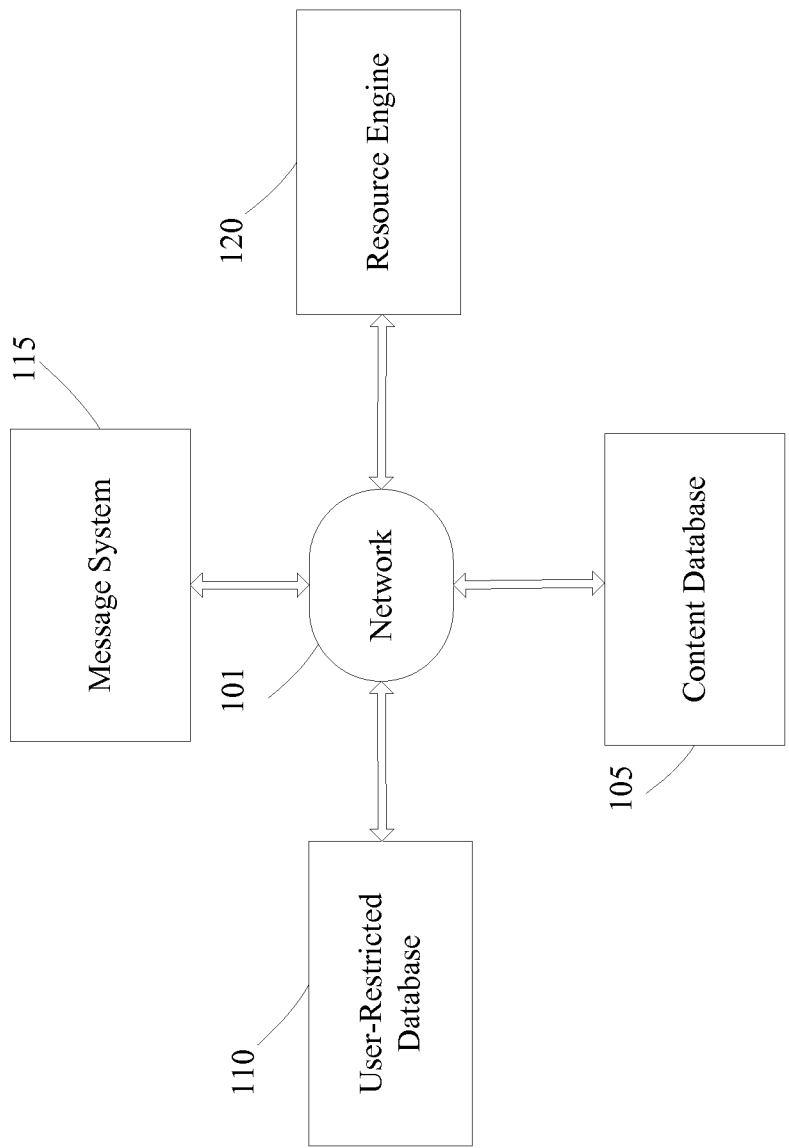
FIG. 1 is a block diagram of an example environment in which a method of providing additional information associated with a vague term in a group message may be implemented.

A user may have interest in creating and/or receiving a message from one or more other users. For example, a user may be a sender and provide a message that is related to planning an event to multiple recipients. The sender of a message may designate one or more users as recipients of the message. A recipient may become a sender of a reply message if the recipient provides one or more of the original recipients and/or the original sender with a message in response to the first message.

A sender of a message may include one or more vague terms in the message. A vague term is a term in a message, wherein the message may not include enough additional information to enable one or more recipients of the message to determine the meaning of the vague term. For example, a sender may include the terms "my house" in a message and not include a location. One or more recipients of the message may not know where "my house" is located and the message may not include further information to enable identification of a location of "my house". Also, for example, a sender may reference "my girlfriend's house" in a message that does not include information about the girlfriend of the sender and/or the location of the girlfriend's house. Also, for example, a sender may include the terms "on my birthday" in a message without including a date of the birthday in the message.

In some instances, the sender and/or one or more recipients of a message may be associated with one or more user-restricted databases. In this specification, the term "database" will be used broadly to refer to any collection of data. As described herein, the data of a database does not need to be structured in any particular way, or structured at all, and it can be stored on storage devices in one or more locations. Thus, for example, a database may include multiple collections of data, each of which may be organized and accessed differently. Examples of user-restricted databases include contacts of a user that may be accessed via a contacts application and/or a message system, information that is associated with contacts via a social networking system, an entity database of associated entities, and/or a collection of documents that may be searched for content.

In some implementations, a user-restricted database that is associated with a sender and/or recipient may include additional information that may be utilized to clarify a vague term. For example, a sender may include the term "my house" in a message, wherein the message does not additionally include the address for the sender's house. One of the recipients of the message may be associated with a user-restricted contacts database that is associated with a contacts application. The contacts database may include the address of the sender and the address of "my house" from the sender may be clarified based on identifying "my" as a reference to the sender and further identifying the address of the sender from the contacts database. In some implementations, multiple user-restricted databases may be utilized to access additional information to clarify one or more vague terms in a message. For example, a sender may send a message that references "my girlfriend's house" and: "my" may be identified as the sender via one or more natural language processing techniques (e.g., coreference resolution), "girlfriend" may be identified as a term that references a relationship via an entity database; the sender's girlfriend may be identified from a database of social media information based on the sender indicating a person as "girlfriend"; and a "house" location may be identified for the "girlfriend" based on a contacts database that is associated with the sender and/or a recipient of the message.

In some implementations, a suggested clarification of one or more terms may be provided to a sender and/or recipient of a message based on determined additional information that is associated with the sender and/or a recipient of the message. In some implementations, the user that is associated with the user-restricted database that was utilized to determine that additional information may be provided with an option to allow the additional information to be provided to other users. In some implementations, the additional information may be provided to a recipient when the recipient indicates that a term in a received message is vague (e.g., selecting a term in a message, selecting a clarification request). In some implementations, a suggested clarification of a vague term and/or a notification of a vague term in a message may be provided to a sender before the sender provides the message to one or more recipients. In instances where a user-restricted database that is associated with a first user may be utilized by a second user to clarify a vague term, the first user may be prompted to grant permission to allow access to the user-restricted database. For example, a sender of a message may allow a recipient access to a contacts database that includes contact information for the sender's contacts.

Referring to FIG. 1, a block diagram is illustrated of an example environment in which a method of providing additional information associated with a vague term in a group message may be implemented. The example environment includes content database 105, a user-restricted database 110, a message system 115, and a resource engine 120. The environment also includes a communication network 101 that enables communication between various components of the environment. In some implementations, the communication network 101 may include the Internet, one or more intranets, and/or one or more bus subsystems. The communication network 101 may optionally utilize one or more standard communications technologies, protocols, and/or inter-process communication techniques.

Figure 7:
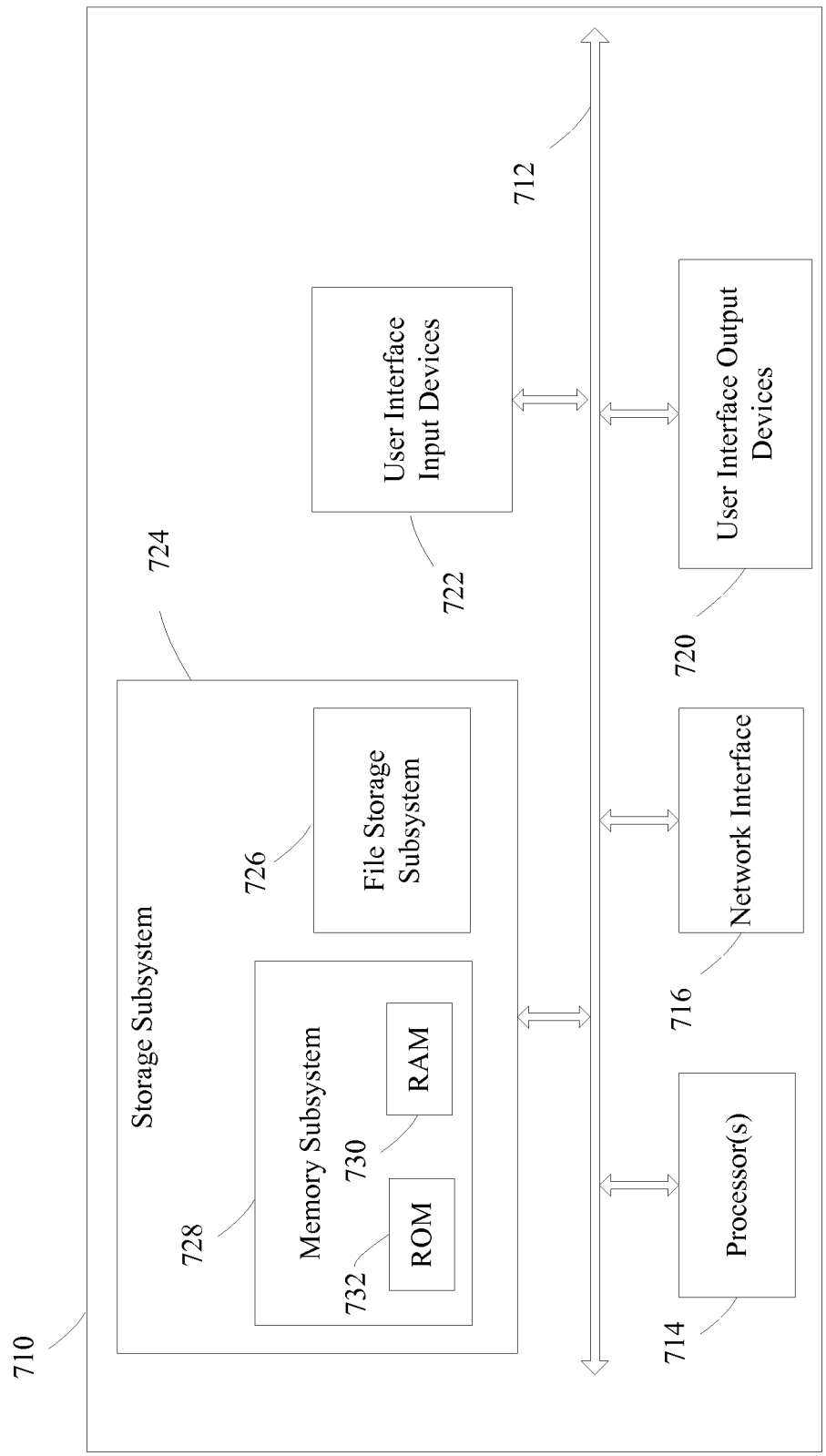
FIG. 7 illustrates a block diagram of an example computer system.

The content database 105, user-restricted database 110, message system 115, resource engine 120, and/or one or more additional components of the example environment of FIG. 1 may each include memory for storage of data and software applications, a processor for accessing data and executing applications, and components that facilitate communication over a network. In some implementations, content database 105, user-restricted database 110, message system 115, and/or resource engine 120 may include hardware that shares one or more characteristics with the example computer system that is illustrated in FIG. 7. The operations performed by components of the example environment may be distributed across multiple computer systems. For example, content database 105, user-restricted database 110, message system 115, and/or resource engine 120 may be computer programs running on one or more computers in one or more locations that are coupled to each other through a network.

The content database 105 and user-restricted database 110 may include one or more storage mediums. For example, in some implementations, the content database 105 and/or user-restricted database 110 may include multiple computer servers each containing one or more storage mediums. Information described herein may optionally be stored in the content database 105 and/or user-restricted database 110. In some implementations, the content database 105 and/or the user-restricted database 110 may include information that is associated with multiple users. For example, content database 105 and/or user-restricted database 110 may include information that is associated with the sender and recipients of a message. In some implementations, databases that include information that is associated with multiple users may include restrictions on information such that a first user may not access information associated with a second user without permission from the first user. In some implementations, one or more of the sender and recipients of a message may have separate content databases 105 and/or user-restricted databases 110. For example, each user may have a content database 105 that includes information only for that user and a second user may have a content database 105 that includes information only for the second user. A user may grant permission to allow access of one or more databases to one or more components and/or one or more additional users. For example, a user may grant one or more components that are associated with a second user to access the contacts information of the user. In some implementations, a user may be associated with multiple content databases 105 and/or user-restricted databases 110. For example, a user may be associated with a database of messages that have been sent by the user, a database of contacts information of the user, and/or a social message system database of contacts and properties associated with the contacts.

In some implementations, content database 105 may be utilized by one or more components to store and/or access one or more messages. For example, a message may be created by a user and stored in content database 105 for subsequent utilization by one or more components. In some implementations, messages may include archived messages that have been previously sent by a user. In some implementations, content database 105 may include messages that have been composed by a user but not sent. In some implementations, content database 105 may include messages that have been received by a user from one or more other users.

In some implementations, content database 105 may include information that is associated with one or more users. For example, content database 105 may be a component of an email application and/or a web-based email system and may include information regarding recipients and/or senders of emails. In some implementations, content database 105 may include contact information for contacts that has been directly provided by a user. For example, content database 105 may be utilized by a contacts application that stores email addresses, phone numbers, and/or social media webpage addresses that have been provided by the user for one or more contacts of the user.

In some implementations, content database 105 may be utilized to identify and/or store one or more entities that may be associated with one or more terms in a message. For example, content database 105 may include a mapping (e.g., data defining an association) between entities and one or more attributes and/or other related entities. In some implementations, entities are topics of discourse. In some implementations, entities are persons, places, concepts, and/or things that can be referred to by a textual representation (e.g., a term or phrase) and are distinguishable from one another (e.g., based on context). For example, the text "bush" in a query or on a webpage may potentially refer to multiple entities such as President George Herbert Walker Bush, President George Walker Bush, a shrub, and the rock band Bush. In some implementations, an entity may be referenced by a unique entity identifier that may be used to identify the entity. The unique entity identifier may be associated with one or more attributes associated with the entity and/or with other entities. For example, in some implementations, the content database 105 may include attributes associated with unique identifiers of one or more entities. For example, a unique identifier for the entity associated with the airport with an airport code "LAX" may be associated with a name or alias attribute of "LAX," another alias attribute of "Los Angeles International Airport" (an alternative name by which LAX is often referenced), a phone number attribute, an address attribute, and/or an entity type attribute of "airport" in the entity database. Additional and/or alternative attributes may be associated with an entity in one or more databases.

Message system 115 may be one or more applications that facilitate communication between two or more users. In some implementations, message system 115 may be an application that is executing on a local computing device of a user. In some implementations, message system 115 may be an application that is executing on a remote computing device that includes a component that is executing on a local computing device of a user and that is in communication with the remote application via communication network 101. For example, message system 115 may include an email application that is executing on the computing device of a user and additionally include an email server that is executing on a remote server and in communication with the application on the computing device of the user via communication network 101. In some implementations, message system 115 may be accessible via a web browser that is executing on a computing device of a user.

Message system 115 may identify one or more messages of a user. A message is a communication between two or more users. A message includes one or more terms and an indication of a sender and one or more recipient parties. In some implementations, a message may be a message trail of one or more related messages. For example, a message may be a message trail that includes an original message sent from User 1 to User 2 and a reply to the message sent from User 2 to User 1. In some implementations, a message may include multiple recipients. For example, User 1 may create a message and provide the message to both User 2 and User 3. Messages may include, for example, emails, text messages, social media postings, instant messages, and/or message board postings. Messages may be identified via content database 105 and/or a user-restricted database 110 may include a collection of archived messages of an associated user. In some implementations, one or more users may be associated with an alias that is different from the contact information of the contact. For example, a user may have contact information that includes an email address of "bob@exampleurl.com" and additionally the user may be associated with an alias of "Bob Smith" and/or "dad."

In some implementations, message system 115 may identify a message when a user creates the message and/or a user receives the message. For example, message system 115 may be a component of an email application and/or a web-based email system and message system 115 may identify messages associated with the user that are sent and/or received via the application and/or system. In some implementations, message system 115 may identify a message of a user when the user begins to compose the message and/or when the user identifies one or more intended recipients of a message. In some implementations, message system 115 may identify one or more messages that are received by the user from one or more other users. For example, message system 115 may identify a message that is received by the user via a message application and/or system. In some implementations, message system 115 may identify one or more messages from content database 105. For example, message system 115 may identify an archived message of a user via content database 105 that was sent and/or received by the user.

In some implementations, message system 115 may identify one or more vague terms in a message. A term may be included in the text of a message and/or a header of a message, such as a subject line of an email. A vague term is a term that has a particular meaning, but the particular meaning may not be determinable by a recipient without additional information.

Figure 3:
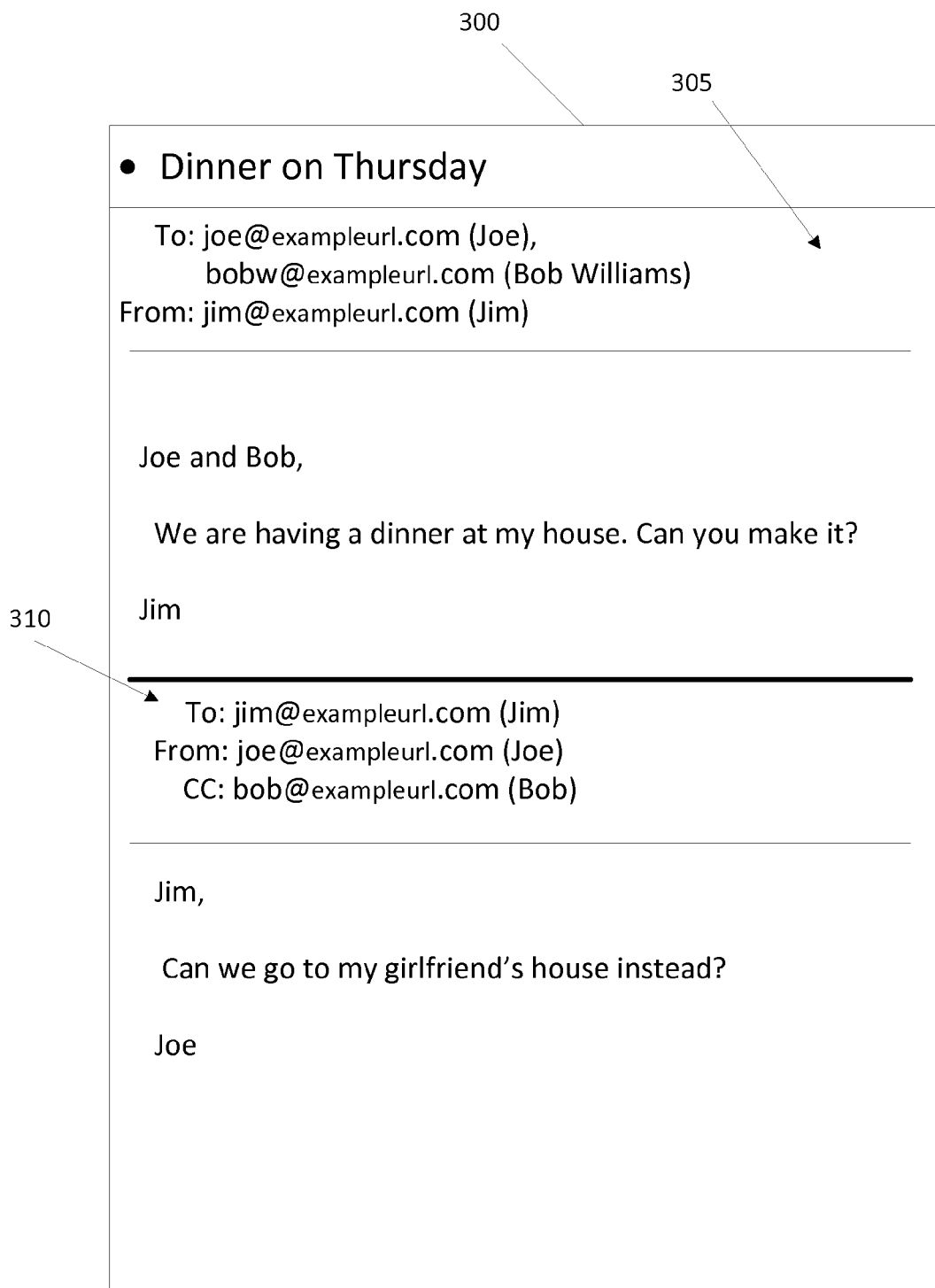
FIG. 3 is an example of a message.

Referring to FIG. 3, an example of a message is provided. The message 300 includes an initial message 305 that was sent from a sender "jim@exampleurl.com" to two recipients, "joe@exampleurl.com" and "bobw@exampleurlcom." The message 300 additionally includes a reply message 310 that was sent from one of the original recipients, "joe@exmapleurl.com," to "jim@exampleurl.com" and "joe@exampleurl.com." The initial message 305 includes a vague term in the body of the message, "my house" and does not include additional information that may be utilized by a recipient to determine the meaning of "my house." The response message 310 includes a vague term "my girlfriend's house" and does not include additional information that may be utilized by the recipients to clarify the location of "my girlfriend's house" and/or the identity of "my girlfriend."

Generally, the message system 115 may receive a message that includes natural language terms and generate one or more structured representations of the natural language terms. For example, the message system 115 may generate a hierarchical parse tree of one or more of the natural language input terms from the message. The parse tree generated by the message system 115 may break down received natural language terms into multiple linked components with annotated information related to the syntactic, structural, semantic, and/or lexical features of the components. For example, the parse tree may be a source dependency tree that breaks the natural language terms into multiple components and defines the syntactic relationship between the components.

In some implementations the message system 115, and/or an additional component may tokenize, lemmatize, part-of-speech (PoS) tag, and/or named entity (NE) tag one or more natural language input terms, such as terms of a sentence and/or a headline. Any tokenization, lemmatization, PoS tagging, and/or NE tagging of terms may be provided to, or be otherwise accessible by one or more components, such as those described herein, to facilitate determination of vague terms in a message.

In some implementations, message system 115 may identify one or more terms that are determined to be vague when present in messages, such as one or more terms that are identified from a database of potentially vague terms. For example, message system 115 may identify one or more terms via content database 105 in a message that are indicative of a relationship without a reference to the specific person, such as "girlfriend," "sister," and/or "boss." Also, for example, message system 115 may identify one or more terms via content database 105 in a message that are indicative of information that is related to a user, such as "address," "phone number," and/or "birthday." In some implementations, pronouns, such as "my," "his," and "our," may be identified as indicative of vague information. For example, message system 115 may identify one or more terms that are pronouns and determine that the pronoun may modify one or more terms in the message, such as the term following the pronoun (e.g., "my house," wherein "my" modifies "house").

Referring to FIG. 3, the term "my house" may be identified from initial message 305 by message system 115 as a vague term based on the term including a pronoun, a term that is indicative of a vague term, and a term that is modified by the pronoun, "house." Message system 115 may determine that terms of that structure are potentially vague and determine that "my house" may be a vague term. Additionally, reply message 310 includes the term "my girlfriend's house," which message system 115 may determine is a vague term that is associated with the sender and that clarifying information for "my girlfriend" and/or "my girlfriend's house" is not included in the message. Message system 115 may identify the terms "girlfriend" and "house" as potentially vague terms via content database 105, identify that the terms are associated with entities that are determined to be vague, and/or that entities associated with the terms are associated with a "vague" property in content database 105, such as a "house" entity having a "vague location" property and/or "girlfriend" entity having a "vague relationship" property.

In some implementations, message system 115 may identify one or more terms in a message that are determined to be vague based on an identified association between the terms and an entity that is determined to be vague. For example, message system 115 may identify the term "my house" and message system 115 may identify a "location" entity that is associated with a "house" entity. Message system 115 may additionally determine, such as by identifying an indication in content database 105 of vague terms and/or concepts, that "location" is a vague concept if it is not annotated with additional information. Message system 115 may determine that "my house" is vague based on identifying a relationship between the "house" entity and "location" entity and identifying that "location" entity is associated with a "vague" concept (e.g., associated with a "vague" entity and/or associated with a "vague" property).

In some implementations, message system 115 may identify one or more terms in a message that are determined to be vague based on identified associations between the terms and multiple entities in content database 105. Based on information identified in the message, message system 115 may not have enough information to determine which entity of the multiple entities is being referenced by the sender. For example, the message may include the term "Fiesta" and message system 115 may identify multiple entities that are associated with "Fiesta" in content database (e.g., the Spanish word for "party," a restaurant named "Fiesta," and a restaurant named "Fiesta del Sol"). Message system 115 may determine that the term is vague based on identifying the multiple potential clarifications of "Fiesta" without additional information in the message.

In some implementations, message system 115 may determine that a term in a message is vague only after determining that the message does not include additional information that may clarify the term. For example, message system 115 may identify the terms "my house" in a message and determine that "my house" may be a vague term based on, for example, identifying a "house" entity that is associated with a "location" entity, wherein locations have been identified previously as potentially vague terms. In the same message, message system 115 may identify "123 Main Street" in the message and/or may identify "123 Main Street" within a given number of terms, sentences, and/or other term distance from "my house." Based on the presence of an address in the same message as "my house" and/or proximate to "my house" in the message, message system 115 may determine that "123 Main Street" is likely a clarification of the potentially vague term "my house" and may not identify "my house" as a vague term.

Message system 115 may provide information from a message with one or more vague terms to resource engine 120 to determine potential additional information to clarify the terms. In some implementations, message system 115 may provide resource engine 120 with the message that was utilized to identify the vague term. In some implementations, message system 115 may provide resource engine 120 with an identifier that may be utilized by resource engine 120 to identify the message, such as a database identifier that may be utilized by resource engine 120 to identify the message in content database 105. In some implementations, message system 115 may provide one or more terms and/or information that is associated with the message, such as one or more terms of the message, one or more identified additional properties of the message and/or terms of the message, identified entities that are associated with the message, the sender of the message, and/or the receiver of the message.

In some implementations, message system 115 may provide the vague term to resource engine 120 with one or more additional terms from the message. For example, message system 115 may identify the term "his house" in a message and additionally identify the term "Bob" in a message. Based on identifying an association between the term "his" and a reference to "Bob," (e.g., via coreference resolution) message system 115 may determine that "his house" and "Bob" may be utilized by resource engine 120 to determine additional information associated with a user that may clarify "his house." Referring to FIG. 3, message system 115 may identify that initial message 305 originated from "jim@exampleurl.com" and/or "Jim" based on identifying the email address of the sender, a nickname "(Jim)" that has been associated with the email address, and/or identifying the last term in the message as "Jim." Message system 115 may provide an indication of the sender to resource engine 120 in addition to the vague term "my house."

In some implementations, message system 115 may provide multiple vague terms from a message that may be utilized by resource engine 120 to clarify one or more of the terms. For example, message system 115 may identify the term "her house" and additionally identify the term "my girlfriend" in a message. Message system 115 may determine that the vague term "her house" may be associated with the vague term "my girlfriend" (e.g., based on coreference resolution) and provide both terms to resource engine 120 to determine additional information associated with a user that may clarify the person that is referenced by "my girlfriend" and/or the location that is referenced by "her house".

In some implementations, message system 115 may provide resource engine 120 a vague term and an indication of one or more of the contacts that were recipients and/or senders of the message. For example, message system 115 may identify a term "my house" as vague and provide resource engine 120 with an indication of the sender based on determining that the composer of a message is likely referencing himself or herself when using the term "my." Also, for example, message system 115 may identify a term "your house" in a message that is sent to one or more recipients and provide resource engine 120 with an indication of one or more of the recipients with the term "your house" based on determining that a sender of a message is likely to be referencing a recipient when using the term "your."

In some implementations, resource engine 120 may identify a user-restricted database 110 that may be a source of additional information that is associated with the sender and/or one or more recipients of the message. A user-restricted database 110 is a collection of data that is associated with a user, wherein the associated user may restrict access, by other users and/or components, to the user-restricted database 110. For example, a database of user contacts may include entries for the contacts that include a phone number, email address, and/or home address of the contact; and one or more entries in the contacts database may be identified based on providing, for example, a contact name, a phone number, an email address, and/or a home address. Other examples of data of a user that may be included in the user-restricted database 110 includes information associated with the user's connections via a social networking system, one or more documents that are associated with the user, search queries that have been submitted by the user, and/or location check-ins of the user.

In some implementations, resource engine 120 may identify one or more user-restricted databases 110 that are associated with a sender of a message. Message system 115 may provide resource engine 120 with a vague term and resource engine 120 may identify a user-restricted database 110 that is associated with the sender of the message that may include additional information to clarify the vague term. For example, message system 115 may provide the vague term "my house" and resource engine 120 may identify a user-restricted database 110 that includes additional information that is associated with the sender, such as a contacts application and/or a social media profile of the user. In some implementations, resource engine 120 may identify a user-restricted database 110 that is associated with a recipient of the message that includes a vague term. For example, message system 115 may identify the term "your house" in a message, determine that the "your" likely references a recipient of the message, and resource engine 120 may identify one or more user-restricted databases 110 that are associated with a recipient of the message.

In instances where a user-restricted database 110 is associated with a user, information from the user-restricted database 110 may not be identified unless the user that is associated with the user-restricted database 110 has authorized the access. For example, message system 115 may prompt a user to allow access to one or more databases associated with the user when the user first uses the message system 115, when the user begins a session and/or begins to compose a message, when the user includes a vague term in a message, and/or when resource engine 120 determines that a user-restricted database 110 may include clarifying additional information. In some implementations, resource engine 120 may normalize the information and/or the user that is identified via a user-restricted database 110 to prevent a given user from identifying the source of the additional information. For example, resource engine 120 may identify information from a user-restricted database 110 of a first user and provide the information to a second user without providing the second user with information that would allow the second user to identify the first user.

Figure 5:
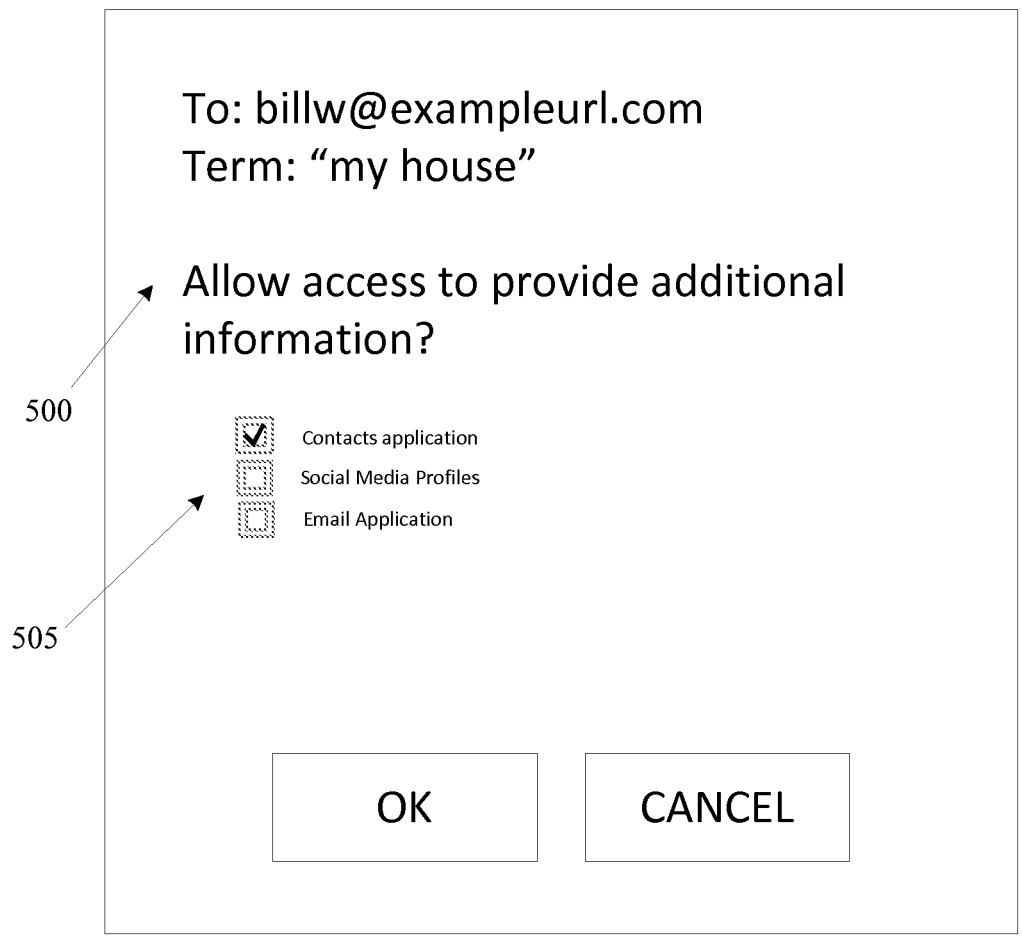
FIG. 5 is an example notification to allow access to one or more databases of a user.

Referring to FIG. 5, an example notification to allow access to one or more databases of a user is provided. The notification includes a message 500 that may provide the receiver of the notification with a message detailing the user-restricted database 110 that resource engine 120 would like to access. The message 500 may prompt the user to allow access to one or more databases for a given message or message trail, for vague terms in messages for one or more users, and/or for all vague terms that are identified by message system 115. In the illustrated example, the user is provided with a prompt to allow access to user-restricted databases 110. The example notification may be provided to a sender of a message before the message is sent to one or more recipients, after a recipient has received the message, and/or in response to a recipient indicating that one or more terms in the message are vague. The notification may be provided to one or more recipients of a message when the user sends a message with a vague term, when one or more of the recipients receives the message, and/or when one or more recipients indicate that a term is vague.

User-restricted database selections 505 allows a receiver of the notification to indicate one or more databases that may be accessed by resource engine 120. In some implementations, message 500 may indicate a database to which resource engine 120 would like access. Database selection 505 includes checkboxes to select one or more databases that are associated with the receiver of the notification. In some implementations, the notification may be provided to the user for each message that includes a vague term that may be clarified by accessing a database of the user. In some implementations, the notification may be provided to a user each time resource engine 120 would like to access a database associated with the user. In some implementations, a user may set preferences for database access and indicate which databases may be accessed and/or which other users have permission to allow resource engine 120 to access information of the user. User-restricted database selections 505 indicate user-restricted databases 110 that are associated with the user and the user may indicate which databases, if any, that the user is allowing access by resource engine 120.

In some implementations, resource engine 120 may identify one or more entries in user-restricted database 110 that may be associated with a vague term. For example, message system 115 may identify "my house" as a vague term that is associated with the sender of the message, resource engine 120 may identify a user-restricted database 110 that includes information associated with the sender, such as a social media profile, and resource engine 120 may identify one or more entries via the social media profile that indicate the address and/or location of "my house," the location of the entity associated with the term identified by message system 115 as a vague reference to the house location of the sender.

In some implementations, resource engine 120 may identify an entity associated with a vague term and identify additional information in a user-restricted database 110 based on an identified entity that is related to the vague term. For example, message system 115 may identify "my girlfriend's house" in a message and determine that the term is vague. Message system 115 may provide resource engine 120 with the vague term and utilize the vague term to identify an entry in a user-restricted database 110 that clarifies the term "girlfriend," such as by identifying, via a social media profile, an indication of a person of a user that is designated as "girlfriend." Additionally, resource engine 120 may identify a user-restricted database 110 that is associated with the person that is identified as "girlfriend" and/or one or more user-restricted databases 110 that are associated with the user that may include a clarification of the location of the "house" that is associated with the person, such as by identifying the address of the person via a contacts database of the user.

In some implementations, resource engine 120 may identify a previous non-vague use of the term by the sender. Message system 115 may provide resource engine 120 with a vague term and resource engine 120 may identify a user-restricted database 110 of messages that have previously been sent by the sender. Based on the terms of one or more previous message, resource engine 120 may identify a non-vague use of the term, a use of the term in a message that additionally includes clarification of the vague term, and/or additional information that may be utilized to clarify the term. For example, message system 115 may identify a message that includes the vague term "my house" and provide the term to resource engine 120. Resource engine 120 may identify a previous message from content database 105 that includes the terms "my house is at 123 Main Street," and resource engine 120 may determine that "123 Main Street" may be utilized to clarify "my house."

In some implementations, resource engine 120 may identify multiple entities that may be utilized to determine a clarification for a vague term. An association between the sender and one or more of the entities may be identified via user-restricted database 110 and may be based on, for example, previous search queries that were submitted by the sender, one or more documents that are associated with the sender, and/or one or more user locations that are associated with the sender. For example, message system 115 may identify the term "Fiesta" that is associated with two entities of restaurants that include the term "Fiesta," such as an entity associated with a "Fiesta del Mar" restaurant and a "Fiesta del Sol" restaurant. Resource engine 120 may identify, via user-restricted database 110, a previous search query submitted by the sender of "Fiesta del Mar," a sender check-in at a location "Fiesta del Mar," and/or an indication that the sender has viewed a webpage associated with the "Fiesta del Mar" restaurant. Resource engine 120 may determine that the vague term "Fiesta" is likely a reference to "Fiesta del Mar" based on identifying that the user-restricted database 110 includes one or more associations of the user with "Fiesta del Mar."

In some implementations, resource engine 120 may determine confidence levels for associations between a vague term and entities that are associated with the vague term and determine a clarification for the vague term based on the confidence levels of the associations. For example, resource engine 120 may identify associations between the vague term "Fiesta" and the restaurants "Fiesta del Sol" and "Fiesta del Mar" and determine a confidence level for each association based on, for example, the number of identified associations between each of the restaurants and the sender in user-restricted database 110. Resource engine 120 may determine a clarification for the vague term based on the entity with the confidence level that is more indicative of an association between the sender and the entity. For example, the resource engine 120 may determine a confidence level for "Fiesta del Mar" based on identifying that the sender has previously checked-in at "Fiesta del Mar" and recently viewed a webpage associated with "Fiesta del Mar." Similarly, resource engine 120 may determine a confidence level for "Fiesta del Sol" based on identifying that the sender has not checked-in at "Fiesta del Sol" and/or that the sender viewed a webpage associated with "Fiesta del Sol" less recently than the user viewed a webpage for "Fiesta del Mar." The confidence levels determined by the resource engine 120 may indicate greater confidence in "Fiesta del Mar" than "Fiesta Del Sol" (e.g., based on the check-in and the more recent webpage visit associated with "Fiesta del Mar"). Based on the greater confidence in "Fiesta del Mar", the resource engine 120 may determine that "Fiesta del Mar" is more likely to be the correct clarification for "Fiesta" than "Fiesta del Sol."

Resource engine 120 may provide clarification of one or more vague terms of the identified vague term to message system 115. In some implementations, the clarification may be provided to one or more users. For example, a clarification may be provided to the sender of a message and/or to one or more recipients of a message. Notifications may be provided to a sender and/or a recipient based on resource engine 120 determining a clarification of a vague term. For example, a user may be provided a notification that a term in a message that the sender is preparing and/or that has been sent may contain a vague term. Also, for example, a recipient may be provided a notification that one or more terms in a received message has a vague term that resource engine 120 has determined a clarification for one or more terms.

In some implementations, message system 115 may provide the vague term clarification to the user before the user sends the message to one or more recipients. For example, a sender may include a vague term in a message and the sender may be prompted that the term is vague and message system 115 may additionally provide the clarification that was determined by resource engine 120 as a suggested replacement for the term. In some implementations, message system 115 may replace the term before the message is sent to one or more recipients. For example, a sender may include the vague term "my house" in a message, resource engine 120 may determine a clarification of "123 Main Street" based on one or more techniques as described herein and provide the clarification to message system 115, and message system 115 may replace "my house" with "123 Main Street" in the message. In some implementations, the sender may be notified of the change before the replacement, before the message is sent, and/or after the message has been sent.

In some implementations, information that is determined from user-restricted database 110 may be utilized to determine additional information from one or more other sources. For example, a sender may include "the Restaurant 1 by my house," wherein "Restaurant 1" has multiple locations. Resource engine 120 may utilize a user-restricted database 110 to determine a location for "my house" and identify one or more locations for "Restaurant 1" from one or more sources. Resource engine 120 may determine the "Restaurant 1 by my house" based on identifying "Restaurant 1" that is located closest to the location of "my house." In some implementations, a vague term may be utilized to determine additional information from resource engine 120 and the determined additional information may be utilized to determine additional information from one or more additional databases.

Referring to FIG. 6, a suggestion notification to prompt a sender of a message that includes a vague term is provided. The notification may be provided to a sender before a message is provided to one or more recipients and/or the notification may be provided to the sender when one or more recipients has indicated that a term in a sent message is vague. The sender is prompted that a term, "my house," has been identified by message system 115 in a message, "Dinner on Thursday." In the notification, the sender is provided with a suggested term that may be determined by resource engine 120 as a clarified term, "123 Main Street," for the vague term "my house." The sender may indicate that a replacement term should not be provided by selecting "CANCEL," that a different term should be used to replace the vague term by selecting "Other," and/or to provide the clarified term by selecting "123 Main Street."

In some implementations, message system 115 may provide a message to one or more recipients with a term that was determined to be vague by message system 115 with a clarified term as determined by resource engine 120. In some implementations, the vague term may be replaced with a clarification without prompting the recipient of the change. In some implementations, one or more recipients of the message may be prompted that a term in the message may be vague and that a replacement term may be available to clarify the term.

Referring to FIG. 4, an example of a message that has been clarified with additional information is provided. The message of FIG. 4 is the same message as FIG. 3 except for an underlined clarification 405 and an appended clarification 410. The underlined clarification 405 is underlined to indicate that additional information has been determined for the underlined term. In some implementations, underlined clarification 405 may be selected by a recipient of the message and the additional information may be provided. For example, the recipient may select the underlined clarification 405 and a pop-window may provide the recipient with the additional information. Also, for example, the recipient may select the underlined clarification 405 and the underlined term may be replaced with the additional information to clarify the term. The appended clarification 410 includes information associated with the bold terms. The additional information that was determined by resource engine 120 may be provided in the appended clarification 410 to provide the recipient with the original term that was determined to be vague and the additional information that was determined by resource engine 120 as related to the vague term.

Figure 2:
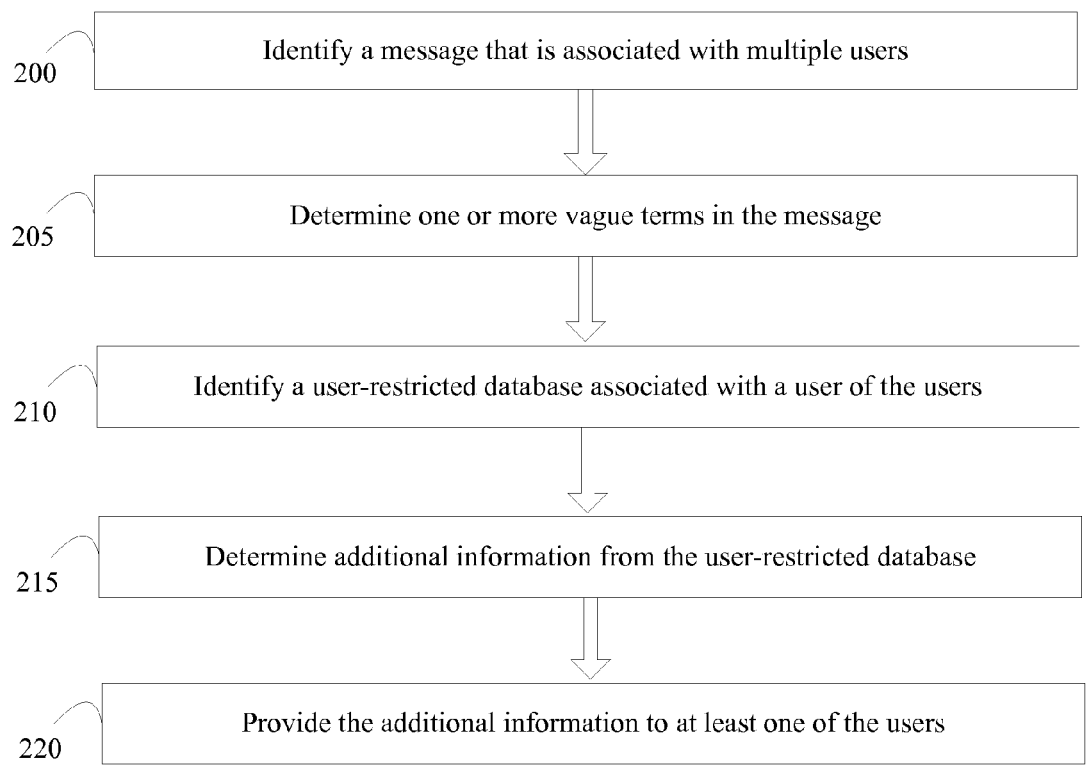
FIG. 2 is a flow chart illustrating an example method of determining additional information based on a vague term in a message.

Referring to FIG. 2, a flow chart illustrating an example method of determining additional information based on a vague term in a message is provided. Other implementations may perform the steps in a different order, omit certain steps, and/or perform different and/or additional steps that those illustrated in FIG. 2. For convenience, aspects of FIG. 2 will be described with reference to one or more components of FIG. 1 that may perform the methods such as the resource engine 120.

At step 200, a message that is associated with multiple users is identified by message system 115. Users include the sender of the message and one or more recipients of the message. The message may be associated with a message trail of multiple related messages. In some implementations, message system 115 may identify a message when the sender sends the message and/or when the recipient receives the message. In some implementations, the message may be identified via a content database 105 that includes one or more archived messages that have been composed by a sender and/or previously provided to one or more recipients.

At step 205, one or more vague terms in the message that was identified at step 200 are determined. One or more techniques as described herein may be utilized to parse the terms of the message into tokens and/or tag terms with additional information. In some implementations, terms that include pronouns may be determined to be vague terms. In some implementations, a database may include one or more terms that are determined to be indicative of vague terms. In some implementations, an entity that is associated with one or more terms may be determined, and the one or more terms may be determined to be vague based on a property of the entity and/or an entity that is associated with the entity. In some implementations, a term may not be vague if additional information is identified in the message that clarifies an otherwise vague term.

At step 210, a user-restricted database 110 associated with a user of the users is determined by resource engine 120 based on the one or more vague terms. The user-restricted database 110 may be associated with the sender or one of the recipients of the message. In some implementations, a user may be identified from the message, such as a user that is a sender, a recipient, and/or a user that is named in the message. A user-restricted database 110 is a database that may be accessed by an associated user, but may be accessed by other users and/or components with permission from the user. In some implementations, resource engine 120 may prompt the user that is associated with the user-restricted database 110 before determining the database to utilize and/or before accessing the database.

At step 215, additional information is determined from the user-restricted database 110 based on one or more of the vague terms. In some implementations, additional information may be identified from the user-restricted database 110 and utilized to clarify the vague term. In some implementations, information is determined from the user-restricted database 110 and additional information may be determined from one or more additional databases. In some implementations, information may be determined from one or more non-user-restricted databases and additional information may be determined from the user-restricted database 110 based on the determined information.

At step 220, additional information is provided to at least one of the users. In some implementations, the additional information is provided only if the user that is associated with the user-restricted database 110 that has been utilized to determine the additional information has given permission to allow the one or more other users to be provided the additional information. In some implementations, a recipient of the additional information may be provided the additional information in addition to the message. In some of those implementations, the vague terms of the message may be replaced with the additional information. In some implementations, the message may be annotated with the additional information.

In situations in which the systems described herein collect personal information about users, or may make use of personal information, the users may be provided with an opportunity to control whether programs or features collect user information (e.g., information about a user's social network, email, social actions or activities, browsing history, a user's preferences, or a user's current geographic location), or to control whether and/or how to receive content from the content server that may be more relevant to the user. Also, certain data may be treated in one or more ways before it is stored or used, so that personally identifiable information may be removed. For example, a user's identity may be treated so that personally identifiable information may not be determined for the user, or a user's geographic location may be generalized where geographic location information may be obtained (such as to a city, ZIP code, or state level), so that a particular geographic location of a user may not be determined. Thus, the user may have control over how information is collected about the user and/or used.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 726 and a file storage subsystem 728, user interface input devices 722, user interface output devices 720, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to identify a message that includes one or more vague terms, determine a user-restricted database that is associated with a user, and provide a clarifying term as a replacement for the vague term. These software modules are generally executed by processor 714 alone or in combination with other processors. Memory 726 used in the storage subsystem can include a number of memories including a main random access memory (RAM) 730 for storage of instructions and data during program execution and a read only memory (ROM) 732 in which fixed instructions are stored. A file storage subsystem 728 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 728 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
    identifying a message that is associated with two or more users, wherein the users include a sender and one or more recipients, and wherein the message includes one or more terms;
    determining a vague term of the terms, wherein the vague term includes a plurality of consecutive words, the consecutive words including at least a word and an additional word;
    determining that at least the word of the vague term is a reference to a given user of the users, the given user being the sender or one of the recipients;
    identifying, based on determining that the word is a reference to the given user, a user-restricted database associated with the given user, wherein the user-restricted database includes content personal to the given user, and wherein access to the user-restricted database is limitable by the given user;
    determining, based on the user-restricted database, additional information that is related to the vague term,
        wherein the user-restricted database is used in determining the additional information that is related to the vague term based on the user-restricted database being associated with the given user and based on the given user being referenced by the word of the vague term; and
    providing the additional information to at least one of the users.

2. The method of claim 1, further comprising:
    identifying an entity that is associated with the vague term, wherein the determining additional information includes:
    determining, from the user-restricted database, a second entity that is related to the entity, and
    determining at least some of the additional information based on the second entity.

3. The method of claim 1, further comprising:
    identifying an entity that is associated with the vague term, wherein the determining, based on the user-restricted database, additional information includes:
    determining a property of the entity from the user-restricted database, and
    determining at least some of the additional information based on the property.

4. The method of claim 1, wherein the user-restricted database includes content related to a previous message between the sender and at least one of the recipients and wherein the determining, based on the user-restricted database, the additional information includes:
    determining at least some of the additional information based on content of the previous message.

5. The method of claim 1, wherein the message is part of a message trail of messages.

6. The method of claim 1, wherein providing the additional information includes providing a notification to the sender and wherein the sender is the creator of the message.

7. The method of claim 6, wherein the notification includes a prompt for the sender to grant permission to allow the providing of the additional information.

8. The method of claim 1, wherein providing the additional information includes providing a notification to at least one of the recipients.

9. The method of claim 8, wherein the notification includes a reference to the one or more vague terms.

10. The method of claim 8, wherein the notification is the message with the one or more vague terms replaced with the additional information.

11. The method of claim 1, wherein the given user is one of the recipients and wherein determining the additional information requires permission from the given user that is associated with the user-restricted database.

12. The method of claim 1, wherein the word is a pronoun, and wherein determining that the word is a reference to the given user includes determining that the pronoun references the given user.

13. The method of claim 1, wherein the given user is one of the recipients and wherein the providing the additional information to at least one of the users includes providing the additional information to an additional recipient of the recipients.

14. A system including memory and one or more processors operable to execute instructions stored in the memory, comprising instructions to:
    identify a message that is associated with two or more users, wherein the users include a sender and one or more recipients, and wherein the message includes one or more terms;
    determine a vague term of the terms, wherein the vague term includes a plurality of consecutive words, the consecutive words including at least a word and an additional word;
    determine that at least the word of the vague term is a reference to a given user of the users, the given user being the sender or one of the recipients;
    identify, based on determining that the word is a reference to the given user, a user-restricted database associated with the given user, wherein the user-restricted database includes content personal to the given user, and wherein access to the user-restricted database is limitable by the given user;
    determine, based on the user-restricted database, additional information that is related to the vague term,
        wherein the user-restricted database is used in determining the additional information that is related to the vague term based on the user-restricted database being associated with the given user and based on the given user being referenced by the word of the vague term; and
    provide the additional information to at least one of the users.

15. The system of claim 14, wherein the instructions further include instructions to:
identify an entity that is associated with the vague term, wherein the instructions to determine additional information include instructions to:
determine, from the user-restricted database, a second entity that is related to the entity, and
determine at least some of the additional information based on the second entity.

16. The system of claim 14, wherein the instructions further include instructions to:
identify an entity that is associated with the vague term, wherein the instructions to determine, based on the user-restricted database, additional information include instructions to:
determine a property of the entity from the user-restricted database, and
determine at least some of the additional information based on the property.

17. The system of claim 14, wherein the user-restricted database includes content related to a previous message between the sender and at least one of the recipients and wherein the instructions to determine, based on the user-restricted database, the additional information includes instructions to:
determine at least some of the additional information based on content of the previous message.

18. The system of claim 14, wherein the message is part of a message trail of messages.

19. The system of claim 14, wherein the instructions to provide the additional information include instructions to provide a notification to the sender and wherein the sender is the creator of the message.

20. The system of claim 19, wherein the notification includes a prompt for the sender to grant permission to allow the providing of the additional information.

21. The system of claim 14, wherein the given user is one of the recipients and wherein the instructions to determine the additional information requires permission from the given user that is associated with the user-restricted database.

22. A non-transitory computer readable storage medium storing instructions executable by a processor, the instructions including instructions to:
identify a message that is associated with two or more users, wherein the users include a sender and one or more recipients, and wherein the message includes a vague term that includes a plurality of consecutive words, the consecutive words including at least a word and an additional word;
determine that at least the word of the vague term is a reference to a given user of the users, the given user being the sender or one of the recipients;
identify, based on determining that the word is a reference to the given user, a user-restricted database associated with the given user, wherein the user-restricted database includes content personal to the given user, and wherein access to the user-restricted database is limitable by the given user;
determine, based on the user-restricted database, additional information that is related to the vague term,
wherein the user-restricted database is used in determining the additional information that is related to the vague term based on the user-restricted database being associated with the given user and based on the given user being referenced by the word of the vague term; and
provide the additional information to at least one of the users.

* * * * *